United States Patent [19]
Hyun

[11] Patent Number: 5,856,854
[45] Date of Patent: Jan. 5, 1999

[54] LIQUID CRYSTAL DISPLAY WITH A REDUNDANCY LINE ZIGZAGS AND/OR OFFSETS ALONG DATA OR GATE LINE

[75] Inventor: Lyu Ki Hyun, Lyojn, Rep. of Korea

[73] Assignee: LG Electronics Inc., Seoul, Rep. of Korea

[21] Appl. No.: 780,184

[22] Filed: Dec. 26, 1996

[30] Foreign Application Priority Data

Dec. 27, 1995 [KR] Rep. of Korea ............................ 58926

[51] Int. Cl.⁶ .................. G02F 1/136; G02F 1/1333; G02F 1/1343
[52] U.S. Cl. .................. 349/43; 349/54; 349/140; 257/59; 257/72
[58] Field of Search ............................... 349/42, 43, 140, 349/147, 54; 345/93; 257/59, 72

[56] References Cited

U.S. PATENT DOCUMENTS

| | | | |
|---|---|---|---|
| 4,938,567 | 7/1990 | Chartier | 349/43 |
| 5,303,074 | 4/1994 | Salisbury | 349/42 |
| 5,559,345 | 9/1996 | Kim | 349/42 |

*Primary Examiner*—William L. Sikes
*Assistant Examiner*—Julie Ngo
*Attorney, Agent, or Firm*—Finnegan, Henderson, Farabow, Garrett & Dunner, L.L.P.

[57] ABSTRACT

A liquid crystal display is disclosed including a redundancy line formed between a substrate and a gate line or data line, in which the redundancy line is formed along but offset and zigzag from the data line. The data line is prevented from being opened due to the stress generated between the data line and redundancy line.

12 Claims, 5 Drawing Sheets

F I G.3
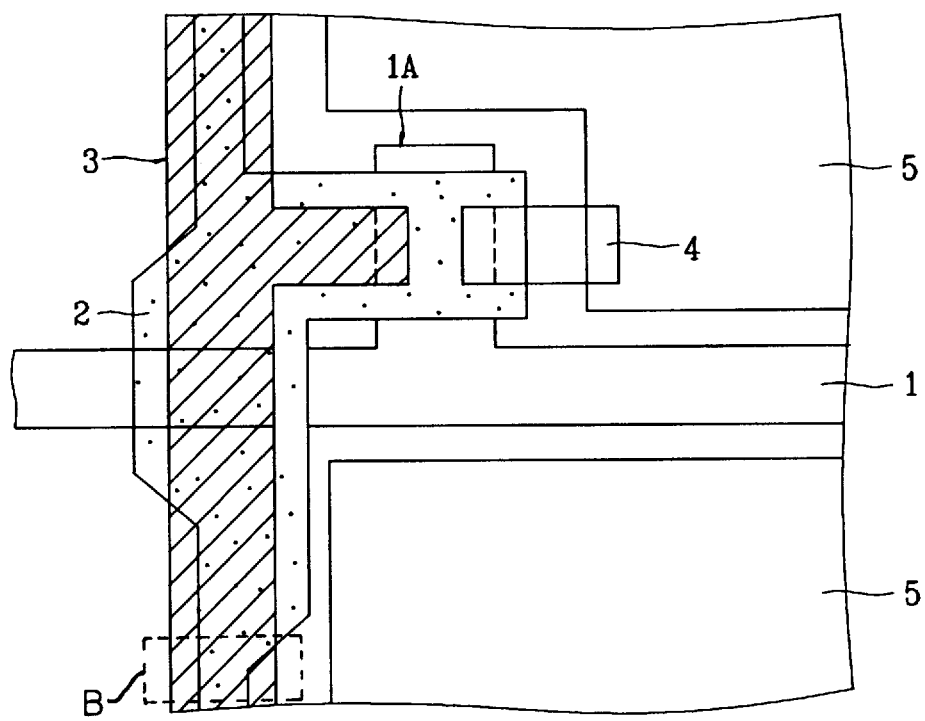

F I G.6
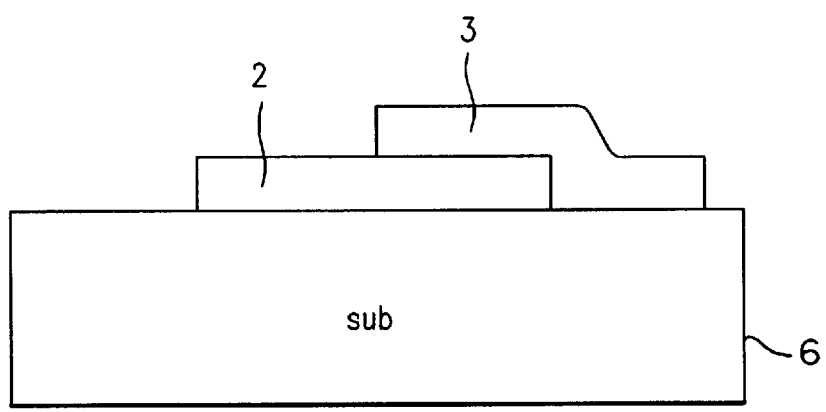

LIQUID CRYSTAL DISPLAY WITH A REDUNDANCY LINE ZIGZAGS AND/OR OFFSETS ALONG DATA OR GATE LINE

BACKGROUND OF THE INVENTION

1. Field of the Invention

The present invention relates to a liquid crystal display. In particular, this invention prevents the signal line of a liquid crystal display from opening during fabrication due to stresses caused by thermal expansion or etching.

2. Discussion of Related Art

Generally, a thin film transistor (TFT) performs as a switching device for switching a video signal to an associated pixel of an active matrix (AM)liquid crystal display (LCD). A TFT-LCD includes a plurality of TFTs and pixel electrodes arranged on a bottom glass plate. Additionally, a top glass plate contains a common electrode and color filter, which displays colors. Liquid crystal fills the gap between the bottom and top glass plates. Furthermore, polarizing plates, attached to the surfaces of the bottom and top glass plates, polarize visible light rays.

However, during fabrication of the above-described TFT-LCD, a metal line serving as a signal line may open due to stresses generated between the metal layer and the glass substrate. These stresses are due to differences in thermal expansion (i.e., different coefficients of thermal expansion). It is also possible for the metal layer to become over etched, as described below. Accordingly, yield is frequently reduced.

The coefficient of thermal expansion of the metal layer is different than that of the glass substrate. Therefore, during heating and cooling, the metal layer expands at a different rate than the glass substrate, thereby causing warpage of the glass substrate or breakage of metal lines.

The metal lines may also open during etching. Specifically, the etching process uses an etchant on areas where the metal lines intersect. This intersection area allows the etchant to penetrate the edge of a relatively high portion, that is, the intersection portion, of the metal lines. This penetration results in over etching of the metal line and, possibly an opening or a break in the metal line.

FIG. 1 illustrates a plan view of a conventional liquid crystal display that attempts to solve some of the above problems by incorporating a redundancy line. As shown in FIG. 1, a gate line 1 is formed on a substrate and is coupled to a gate electrode 1A, which forms a TFT region of the liquid crystal display. A data line 3 is formed on the substrate perpendicular to gate line 1. A drain electrode 4 is formed over a portion of gate electrode 1A. Drain electrode 4 is connected to a pixel electrode 5.

Furthermore, a redundancy line 2 of a semiconductor layer is formed along data line 3 and the TFT region, where gate electrode 1A and drain electrode 4 are formed. Here, redundancy line 2 is formed wider than data line 3 where gate line 1 and data line 3 intersect, but it is formed narrower than the data line in region A. Redundancy line 2 is also wider at the TFT region where drain electrode 4 overlaps gate electrode 1A. This prevents the etchant from penetrating the intersection of the metal lines during the etching process.

The conventional liquid crystal display described above, however, suffers from the following problems. Portions over data line 3 extending between the gate line 1 are formed wider than the underlying redundancy line 2, as shown in FIG. 4, which is a cross-sectional view taken along line 4—4 in FIG. 1. As a result, data line 3 frequently has poor step coverage over redundancy line 2, and data line 3 is thinned over edge portions of redundancy line 2. These thinned regions are susceptible to over etching and can cause breaks in data line 3.

Portions of data line 3 that cross over the gate line have widths which are less than the redundancy line 2, as shown in FIG. 5, which is a cross-sectional view taken along line 5—5 in FIG. 1. As further shown in FIG. 5, an insulative layer 15 is provided between data line 3 and gate line 1. Due to differences in the coefficients of thermal expansion between semiconductor redundancy line 2 and metal data line 3, redundancy line 2 and data line 3 expand and contract at different rates in response to changes of temperature. Thus, breaks can occur in data line 3 for this reason also.

SUMMARY OF THE INVENTION

Accordingly, the present invention provides a liquid crystal display that substantially obviates one or more of the problems due to limitations and disadvantages of the related art. The present invention, therefore, embodies a liquid crystal display capable of preventing open lines caused by stresses resulting from different coefficients of thermal expansion of metals and etchant.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as broadly described herein, an embodiment of the present invention includes a liquid crystal display having a redundancy line formed between a substrate and a gate line, or a data line. The redundancy line is formed over one side of and along the data line.

Another embodiment includes a liquid crystal display having a redundancy line formed between a substrate and a gate line, or data line. The redundancy line is formed wider than the data line at a portion where the gate line and data line intersect. Additionally, the redundancy line zigzags over the data line and is offset on one side of and along the data line at portions other than the portion where the gate line and data line intersect. Where the gate line and data line intersect, the redundancy line is wider then the data line.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

In the drawings:

FIG. 3 is a plan view of a liquid crystal display according to a second embodiment of the present invention;

FIG. 6 is a cross-sectional view taken along line 6—6 in FIG. 2a.

DETAILED DESCRIPTION OF PREFERRED EMBODIMENT

Figure 2A:
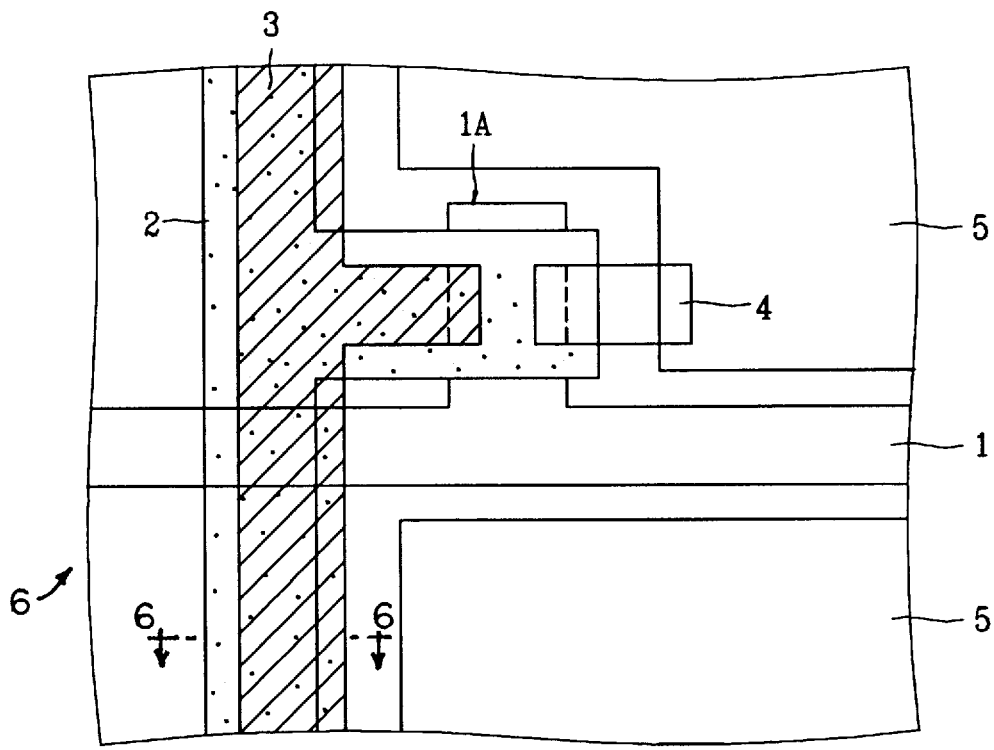
FIGS. 2A and 2B are plan views of a liquid crystal display according to a first embodiment of the present invention.
Figure 2B:
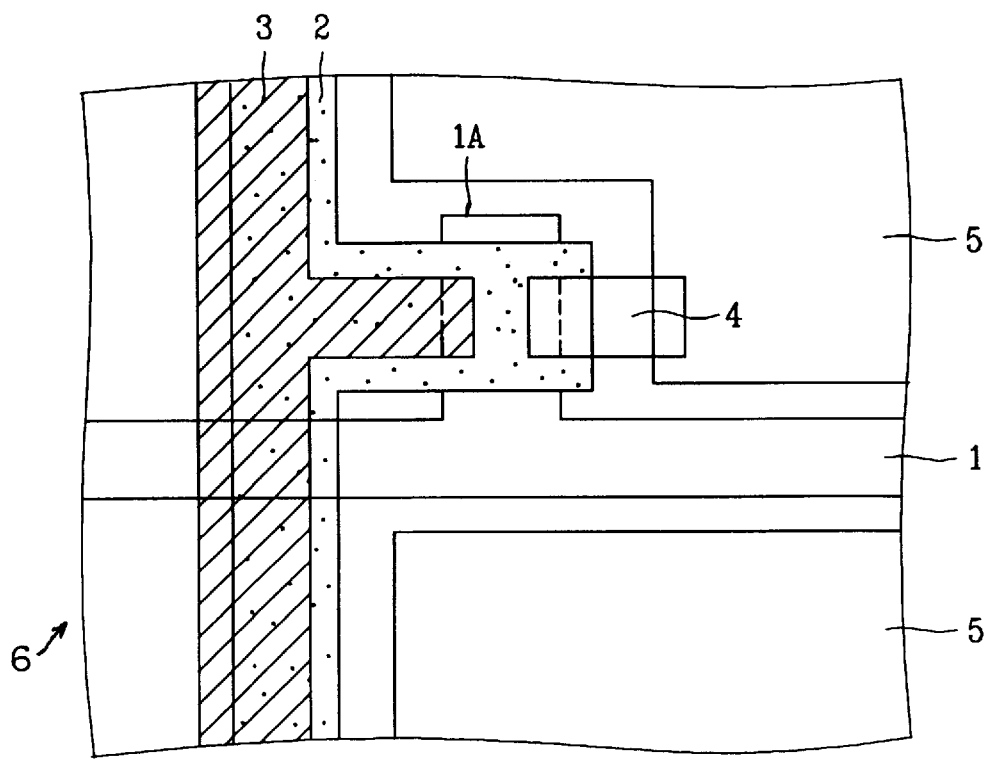
Figure 4:
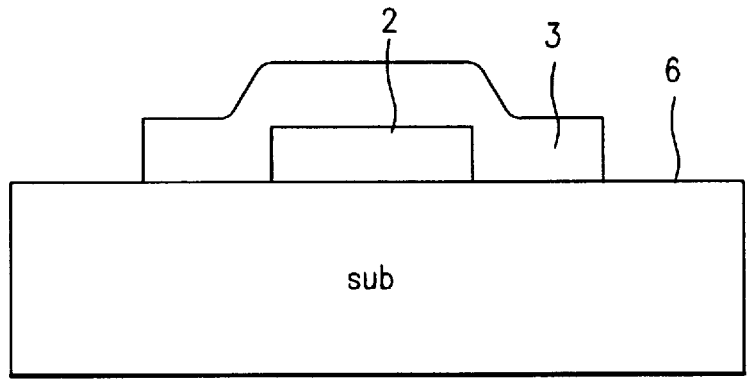
FIG. 4 is a cross-sectional view taken along line 4—4 in FIG. 1.
Figure 5:
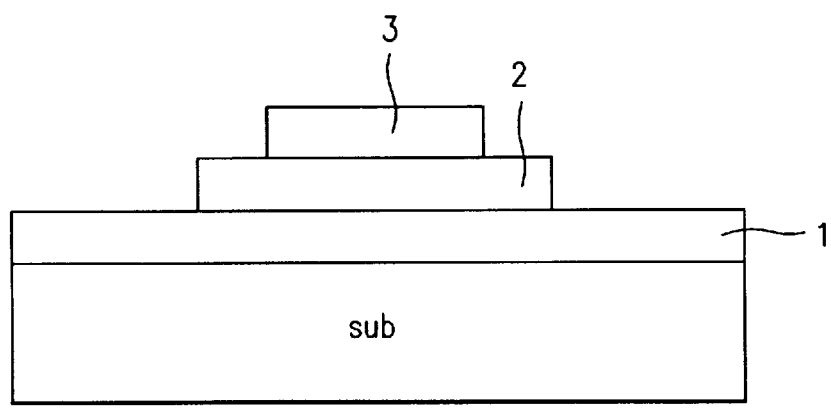
FIG. 5 is a cross-sectional view taken along line 5—5 in FIG. 1.

Reference will now be made in detail to the preferred embodiments of the present invention, examples of which are illustrated in the accompanying drawings. FIGS. 2A and 2B are plan views of a liquid crystal display according to a first embodiment of the present invention. As shown in FIGS. 2A and 2B, a gate line 1 is formed on a substrate 6. Data line 3 is formed on substrate 6 extending in a direction perpendicular to gate line 1. A gate electrode 1A is connected to gate line 1, which forms a TFT of a LCD. A drain electrode 4 is formed over a portion of gate electrode 1A, and a pixel electrode 5 is connected to drain electrode 4.

A redundancy line 2, including a semiconductor layer, is formed along data line 3 and a TFT region where gate electrode 1A and drain electrode 4 are formed. Here, redundancy line 2 is formed as wide as data line 3 and offset from data line 3. That is, redundancy line 2 and data line 3 are not aligned, such that one is formed directly over the other, but rather redundancy line 2 extends beyond one side of data line 3. As shown in FIG. 6, which is a cross-sectional view taken along line 6—6 in FIG. 2a, step coverage of data line 3 over redundancy line 2 is improved, thereby preventing breaks from occurring in data line 3.

Moreover, the formation of redundancy line 2 on one side of data line 3 prevents breakage due to thermal stresses (resulting from expansion, for example) generated between metal data line 3 and semiconductor redundancy line 2. Although the precise mechanism of thermal stress reduction is not fully understood, it is believe that less thermal stress is associated with the present invention because redundancy line 2 bends in a direction opposite of data line 3, thereby offsetting any stress that may occur in data line 3. Alternatively, it is believed that less stress is developed because the metal data line 3 does not contact the entire redundancy line.

FIG. 3 is a plan view of a LCD according to a second embodiment of the present invention. As shown in FIG. 3, redundancy line 2 is formed between substrate 6 and gate line 1 or data line 3. Redundancy line 2 is formed wider than data line 3 at a portion where gate line 1 and data line 3 intersect. Additionally, it zigzags along data line 3 except where data line 3 and gate 1 intersect. At the point where data line 3 and gate line 1 intersect, redundancy line 2 is wider then data line 3. An insulative layer can further be provided between gate line 1 and data line 3 at least in the vicinity of the gate line/data line intersection. This insulative layer can also be provided in a similar fashion in the embodiment illustrated in FIGS. 2A and 2B above.

Figure 1:
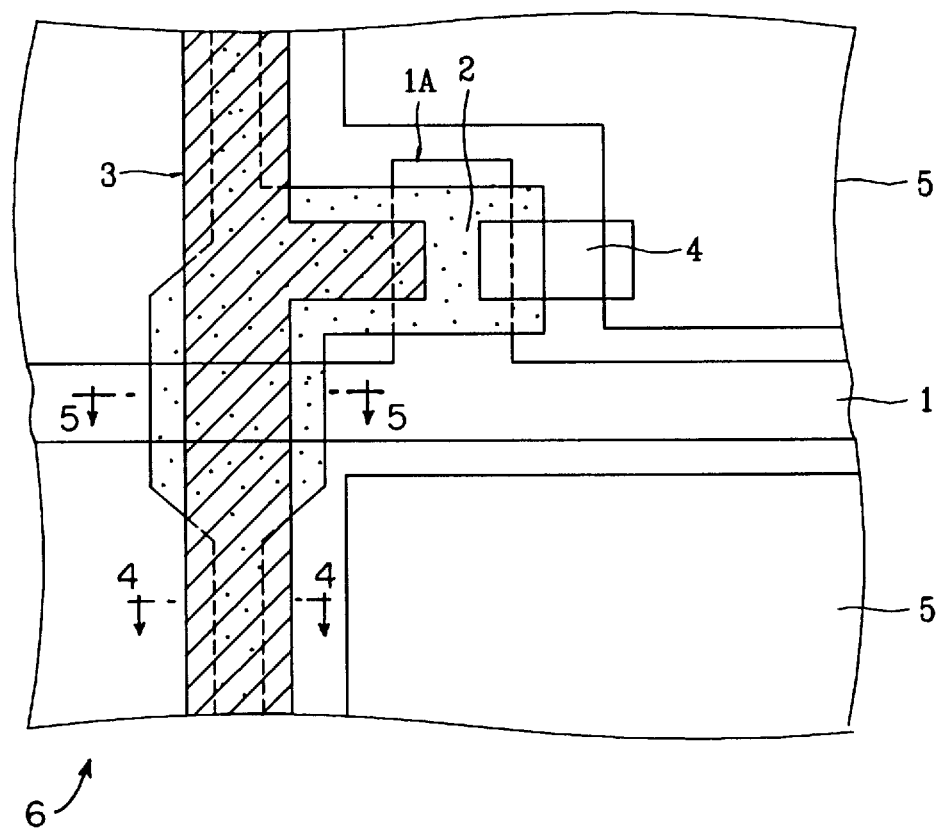
FIG. 1 is a layout of a conventional liquid crystal display.

Moreover, unlike the narrow "neck" shaped portion of the redundancy line of the conventional liquid crystal display shown at line 4—4 in FIG. 1, redundancy line 3 consistent with the present invention includes a relatively wide portion B in FIG. 3, which is offset or misaligned with data line 3. Accordingly, the data line consistent with the present invention is not susceptible to etchant penetration, as in the conventional device.

As described above, the present invention has the following advantages. First of all, breaks in the data line resulting from etchant penetration are prevented because the redundancy line extends along the data line but only on one side thereof, or zigzags along the data line. Furthermore, because the redundancy line is formed on one side of the data line, the data line is prevented from opening due to the thermal expansion stresses generated between the data line and redundancy line.

It will be apparent to those skilled in the art that various modifications and variations can be made in the liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a gate line extending in a first direction;
   a redundancy line extending in a second direction substantially perpendicular to said first direction, said redundancy line having a first edge portion and a second edge portion spaced a distance from one another and extending substantially parallel to one another; and
   a data line extending in said second direction and being over only one of said first and second edge portions of said redundancy line.

2. A liquid crystal display device in accordance with claim 1, wherein said redundancy line has a width substantially equal to a width of said data line.

3. A liquid crystal display device in accordance with claim 1, wherein said redundancy line includes a semiconductor material.

4. A liquid crystal display device in accordance with claim 1, wherein said data line includes a metal.

5. A liquid crystal display device comprising:
   a substrate;
   a gate line extending in a first direction on said substrate;
   a redundancy line extending in a second direction on said substrate, said redundancy line having first and second parts, said first part of said redundancy line having a first and second parallel edge portions, and said second part having first and second edge portions; and
   a data line, extending in said second direction, overlapping only one of said first and second edge portions of said first part of said redundancy line, and overlapping only one of said first and second edge portions of said second part of said redundancy line, wherein said redundancy line zigzags along said data line.

6. A liquid crystal display device in accordance with claim 5, wherein said redundancy line zigzags along said data line.

7. A liquid crystal display comprising:
   a substrate;
   a gate line disposed on said substrate;
   a data line extending in a direction perpendicular to the gate line and provided on the substrate; and
   a redundancy line coupled to said data line to relieve a thermal stress generated in said data line, where said redundancy line has a first portion and a second portion, said second portion zigzagging along said data line.

8. A liquid crystal display in accordance with claim 7, wherein said portion is a first portion and said redundancy line having a second portion spaced from said first portion, said second portion zig-zagging along said data line.

9. A liquid crystal display device in accordance with claim 7, wherein said redundancy line includes first and second edge portions extending parallel to on another, said data line overlapping only said first edge portion of said redundancy line.

10. A liquid crystal display device in accordance with claim 7, wherein said data line comprises a metal.

11. A liquid crystal display device in accordance with claim 7, wherein said redundancy line comprises a semiconductor.

12. A liquid crystal display device in accordance with claim 7, wherein a width of a portion of said redundancy line is greater than a width of said data line.

* * * * *